Nov. 3, 1942.   P. J. TRUSCOTT   2,301,096
VALVE
Filed Sept. 24, 1940
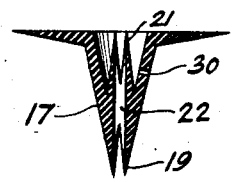
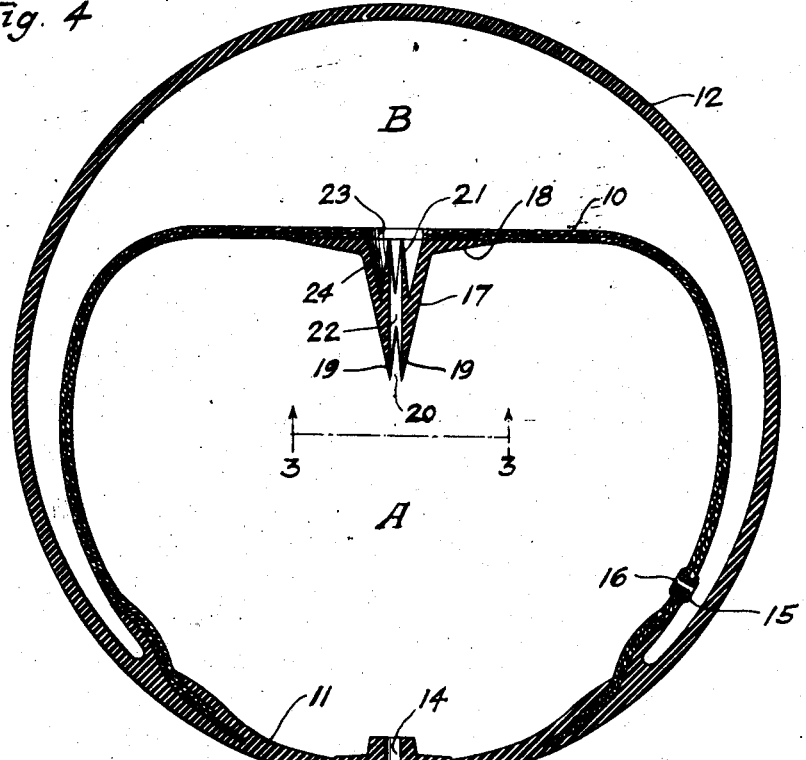
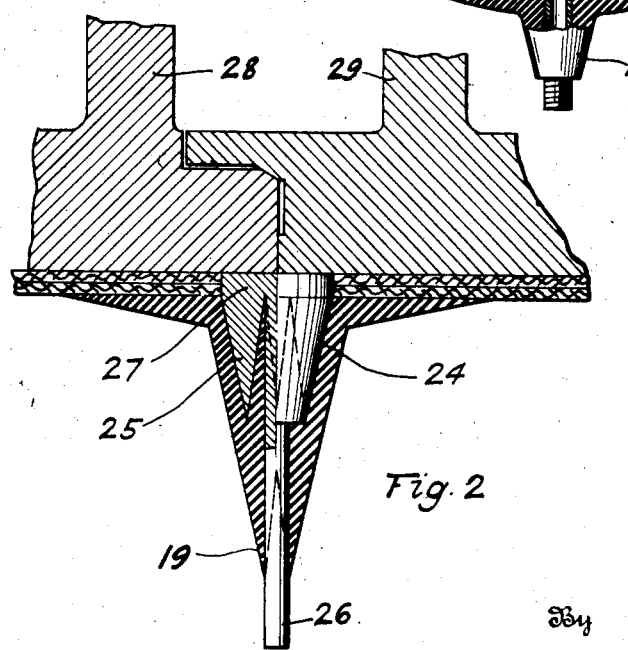
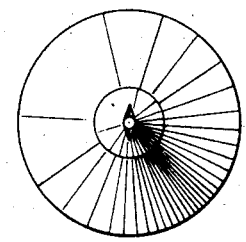
Fig. 1
Fig. 2
Fig. 3
Fig. 4
Inventor
Percy J. Truscott
By
Attorney Patented Nov. 3, 1942

2,301,096

UNITED STATES PATENT OFFICE 2,301,096

VALVE

Percy J. Truscott, now by judicial change of name John Phillip Truscott, Akron, Ohio, assignor to Wingfoot Corporation, Wilmington, Del., a corporation of Delaware Application September 24, 1940, Serial No. 358,088

6 Claims. (Cl. 277—71)

The present invention relates to a safety tube in which there are a plurality of chambers and a valve arranged between the chambers for partially or wholly cutting off communication between said chambers in the event either chamber fails. This valve normally permits rapid transfer of air from one chamber to the other whereby a single valve may be used to inflate one chamber and the air from that chamber will flow into the second chamber without any appreciable restriction. Thus, during inflation a check of the pressure at the main valve, which would ordinarily register only the pressure in the chamber with which it immediately communicates, will give the correct pressure for both chambers, since the valve of this invention provides for quick equalization of the pressures in the two chambers.

Another object of this invention is to provide a valve of this character in which the valve itself is confined entirely within the boundaries of one chamber so that the valve mechanism will not be subject to damage in the event of failure of the other chamber.

A still further object of this invention is to simplify the valve mechanism in such a way as to make the process of producing such a tube more economical.

Another object of this invention is to provide an all-rubber valve, or perhaps a fabric-reinforced rubber valve which will efficiently restrict the air in one compartment when the other compartment fails.

Other objects of this invention will appear hereinafter as the invention proceeds, the novel features, arrangements and combinations being clearly pointed out in the specification and in the claims thereunto appended.

In the drawing:

Fig. 1 represents a cross-section through a tube provided with a valve constructed in accordance with this invention;

Fig. 2 illustrates a step in the method of molding the safety tube shown in Fig. 1;

Fig. 3 is a view of the valve looking in the direction 3—3 in Fig. 1; and

Fig. 4 is a cross-section through a modified form of valve.

In various types of safety tubes a plurality of chambers are provided and each of these chambers is connected by some suitable valve mechanism to an adjacent chamber, the valve mechanism either completely or partially cutting off the flow of the fluid from one chamber to the other in the event that the second-mentioned chamber fails, as in the case of a blowout. Some tubes of this character, and the one with which my invention is primarily concerned, are formed with two concentrically arranged tubes, one within the other, with the tubes joined at their bases and with the inner tube of substantially smaller cross-section than the outer tube. A tube of this type which employs a small fixed communicating passage is exemplified in the patent to Lee 2,173,065, but that tube is not provided with a valve mechanism, such as is described in this specification, and due to the restricted port therein will not permit quick inflation through a single valve communicating with but one of the chambers.

It is therefore an important object of this invention to provide such a tube with a quick inflating means and a two-way protection which will prevent complete collapse of the safety tube in the event either of the chambers fails.

Referring now particularly to Fig. 1, the chamber A is formed by an annular U-shaped wall 10 of one or more layers of fabric joined at its inner periphery by the rubber base 11. The outer chamber B is formed by at least a portion of the wall 10 and an outer rubber wall 12 which encompasses the inner chamber and is joined thereto at the base 11 thereof. A valve 13 having a passage 14 therein is used for supplying air to the inner chamber A from any suitable source of supply. A grommet such as 15 having a bore 16 of approximately not over .05" in diameter is inserted in the wall 10 to form a communicating passage between the chambers A and B for a purpose which will hereinafter be explained.

In order to provide quick inflation of both chambers A and B, I provide a valve indicated generally at 17. This valve is preferably made solely of rubber and is attached by the base flange 18 thereof to the inner side of the wall 10. The valve is substantially conical and is provided at its innermost end with a pair of lips 19 formed by a slit 20. The valve also has a pair of lips 21 at its outermost end similar to the lips 19. These pairs of lips 19 and 21 are at the opposite ends of a passage 22 which is substantially as great in diameter as the passage 14 in the valve 13 whereby under normal inflation the air entering the chamber A will readily pass into the chamber B to simultaneously inflate both chambers, whereby a reading of the pressure in the chamber A by a suitable pressure gauge applied to the valve 13 will also indicate the pressure in the chamber B.

It will be noted that the lips 21 preferably do not extend beyond the base 18. This simplifies the molding of this valve and also prevents the lips 21 from projecting beyond the outermost surface of the wall 10. The wall 10 is provided with an opening 23 which is of a diameter substantially as large as the opening 24 in the valve surrounding the lips 21. The valve is preferably partially cured before being applied to the wall 10 so as not to change its shape during the subsequent molding operation which will be described presently.

The functioning of the tube so constructed is as follows. The air is introduced through the valve 13 into chamber A and equal pressures are built up in chambers A and B until the tube is inflated the desired amount. The chambers A and B maintain equal pressures during use, due to the passage 22 and the opening 16 which provide intercommunicating means for the chambers. Should the outer wall 12 of the outer chamber fail suddenly, as in the case of a blowout, the rush of air from the inner chamber A into the chamber B and thence into the atmosphere will cause the lips 19 to be forced together and then be held together by the pressure of the air in chamber A. The only exit for the air after this has occurred is through the opening 16 and this opening permits the air to leak slowly out of the chamber A into the atmosphere, to cause the deflation of the safety tube so that the operator of a vehicle to which this is applied will be required to stop and change the tube before material damage has been done to the tire or tube. However, in case it is desired to confine all of the air to the inner chamber A to permit the operator of the vehicle to proceed indefinitely on a soft tire, the grommet 15 may be eliminated.

Similarly, if the base 11 of the safety tube should fail, as by rim cut or otherwise, the rush of air from chamber A to chamber B will cause a closing of the lips 21 and the air will thus be restricted within the chamber B and as the tube flattens out the tire to which this is applied will be supported by the air remaining within the chamber B, the air leaking out slowly through the grommet 15 in case such a grommet is employed.

It will thus be seen that my invention has provided for quick inflation of the tube and means to restrict the air within one of the chambers of the tube in case of the failure of the other chamber, but at the same time provision is made for constant equalization of the pressures in the chambers during normal use of the tube. Also, in case it is desirable, the grommet will provide a slow deflation of the intact chamber for the purpose of eventually causing the tube to go flat, although retaining the air within the good chamber a sufficient length of time to permit the operator of the vehicle to bring the same to a safe stop.

In molding a tube of this character the inner wall 10 is first formed with or without the base 11 attached thereto. If the base is not attached thereto the wall 10 can be molded on an air bag within a suitably shaped mold to give the fabric substantially the U-shape illustrated in the drawing. It will be necessary in such a case to provide a suitable recess in the outer surface of the air bag to receive the valve 17, unless it is desired to later attach the valve to the wall 10 after the molding operation and this latter method would probably be the more desirable.

However, tubes of this character are preferably molded as a complete tube with the base 11 attached to the fabric wall 10, in which case the valve would be applied to the inner side of the wall 10 in alignment with the opening 23 before the base 11 completely spanned the gap between the ends of the fabric wall. The tube forming the inner chamber A would then be placed within a watch-case mold or the like and inflated to bring the walls thereof against the walls of the mold, all as is more specifically described in the Lee Patent 2,090,210. However, since air can escape through the opening 22, the method shown in this latter Lee patent would not be satisfactory and therefore it is necessary that the air be prevented from leaving the chamber A during this molding operation. This is accomplished by providing a metal plug, such as shown in Fig. 2, and designated by the numeral 25. It will be noted from an inspection of this figure that this metal plug completely fills the recess 24 of the valve, and the stem 26 thereof which fills the bore 22 extends beyond the inner lips 19. Also the plug extends beyond the base of the valve at 27, a distance substantially equal to the thickness of the wall 10, so as to bring the outer surface of the plug in alignment with the outer surface of the wall 10. The inner chamber may then be molded in a mold such as shown in Lee Patent 2,090,210 and in Fig. 2 I have illustrated the mold halves by the reference characters 28 and 29.

After this molding operation the plug may be removed by forcing the stem 26 against the opposite wall of the tube, which will result in forcing the plug upwardly out of the valve until the portion 27 thereof is in a position to be grasped by any suitable means for completely withdrawing the plug from the valve.

After the inner chamber has been formed the outer chamber is applied thereto by attaching the edges of a substantially inverted U-shaped annular strip of rubber to the base 11 of the tube, as is more fully described in the aforesaid Lee patents.

In Fig. 4 I have shown a still further modification of the valve shown in Fig. 1 in which the same reference characters refer to similar parts in Fig. 1 and the only difference in this figure is that the wall of the valve is provided with a lateral passage 30 substantially no larger than the opening 16 in the grommet 15, whereby the grommet 15 may be eliminated and in case of a blowout the slow seepage of air through the passage 40 will cause a slow deflation of the chamber which remains intact after a blowout occurs. In this manner the grommet 15 may be eliminated and the entire valve mechanism be formed before application to the wall 10. The opening 40 may be molded into the valve during the molding of the valve, or may be formed therein later by a heated wire or the like.

In case it is found desirable to reinforce portions of the valve 17, fabric may be incorporated in the rubber but it is preferred that the lips 19, 21 etc. be only of rubber to increase their flexibility and sensitiveness to insure quick closing of the valve in case of failure of one chamber.

With this type of valve the action is dependent on the difference in air pressure existing on both sides of the valve resulting in a rush of air through the valve and is not dependent on the deformation of the wall to which it is attached or the engagement of the valve with another portion of the tube.

Obviously those skilled in the art to which this invention pertains may make various changes in the particular arrangement and construction of the parts herein described without departing from the spirit of this invention and therefore I do not wish to be limited in my invention except as may hereinafter be set forth in the claims.

What I claim is:

1. A valve, for use with plural-chambered safety tubes having radially inner and outer chambers, comprising a flexible rubber body having an axial bore and oppositely extending conical portions, each portion terminating in a thin rubber edge, said edges being transversely slitted to provide a pair of lips at each of the opposite ends of the bore, said lips of each pair being normally spaced apart a distance equal to the diameter of the bore and allowing a normal flow of air therethrough in either direction but at least one pair of lips being adapted to seal and prevent a sudden flow of air under considerable differential pressure therethrough in either direction, and coaxial, tubular supporting means of rubber connected to substantially the center of the body and terminating at a point to surround one conical portion and one pair of the lips.

2. A valve for use with plural-chambered safety tubes, and comprising a body having an axial bore and oppositely extending portions, flexible lip means on the end of each oppositely extending portion and surrounding the bore, said lip means being normally spaced apart a distance equal to the diameter of the bore and allowing a normal flow of air therethrough in either direction but adapted to restrict the bore against the sudden flow of air under considerable differential pressure therethrough, and conduit means connected adjacent the center of the body and substantially surrounding one of the oppositely extending portions and the associated lip means.

3. A valve adapted to be positioned between radially inner and outer chambers of a plural-chambered safety tube, and comprising an integral, tubular rubber valve stem having a large internal bore, an integral rubber lip valve associated with one end of the valve stem and preventing only the flow of fluid under high differential pressure through the valve stem towards its other end, and an integral rubber lip valve in the bore of the tubular rubber valve stem and preventing only the flow of fluid under high differential pressure through the valve stem in the opposite direction.

4. A valve for use with plural-chambered safety tubes and the like, and comprising an elongated rubber body having inwardly tapered ends and an axial bore, each of said ends terminating in a pair of integral rubber lips, each pair of lips normally being open to allow the usual flow of fluid in either direction through the bore but one pair of lips being adapted to restrict the bore when a high differential pressure exists in one direction at opposite ends of the rubber body, and the other pair of lips being adapted to restrict the bore when a high pressure differential exists in the other direction.

5. A valve adapted to be positioned between radially inner and outer chambers in a plural-chambered safety tube, and comprising a body portion having a bore therethrough, a rubber valve comprising a pair of lips associated with each end of the body adjacent the bore and extending in opposite directions, said lips being spaced apart during normal flow of fluid in either direction but at least one pair of lips being adapted to restrict the bore when a greater than normal flow of fluid attempts to establish itself through the bore in either direction.

6. A valve adapted to be positioned between radially inner and outer chambers in a plural-chambered safety tube, and comprising a valve stem, a pair of oppositely extending rubber lip valves associated with the end of the valve stem and open to the normal flow of fluid in either direction but at least one of the lip valves being adapted to restrict the bore when a more than normal fluid flow attempts to establish itself in either direction through the valve stem, and by-pass means associated with the assembly for bleeding small amounts of fluid through the valve.

PERCY J. TRUSCOTT.